N. J. NICOLAIDES.
APPARATUS FOR LOADING SHIPS AND FOR DISCHARGING CARGO THEREFROM.
APPLICATION FILED OCT. 17, 1913.

1,150,699.

Patented Aug. 17, 1915.
3 SHEETS—SHEET 3.

UNITED STATES PATENT OFFICE.

NICOLAS JAMES NICOLAIDES, OF BOURGAS, BULGARIA.

APPARATUS FOR LOADING SHIPS AND FOR DISCHARGING CARGO THEREFROM.

1,150,699.  Specification of Letters Patent.  Patented Aug. 17, 1915.

Application filed October 17, 1913. Serial No. 795,778.

*To all whom it may concern:*

Be it known that I, NICOLAS JAMES NICOLAIDES, a subject of the King of Greece, residing at Bourgas, in the Kingdom of Bulgaria, shipping agent, have invented a new and useful Improvement in Apparatus for Loading Ships and for Discharging Cargo Therefrom, of which the following is a specification.

This invention relates to apparatus for loading ships and for discharging cargo therefrom, and to that class of discharging means wherein elevators furnished with buckets, carriers or the like are employed for raising the cargo from the hold of the vessel and discharging it upon a conveyer or chute on both sides of the ship.

The object of the present invention is to enable several elevators to be employed in one hold of the ship, so that the cargo may be discharged from different parts of the hold simultaneously, thereby expediting the unloading and loading of the ship.

According to this invention the heads of the elevators are supported upon two parallel shafts connected together by a transverse driving shaft the parallel shafts being disposed fore and aft of the vessel and mounted upon suitable supports, while the transverse shaft is driven by one engine or by the ship's winch.

The invention further consists in certain improvements in the construction of the elevators.

Apparatus embodying my invention is illustrated in the accompanying drawings, in which:—

Figure 1:
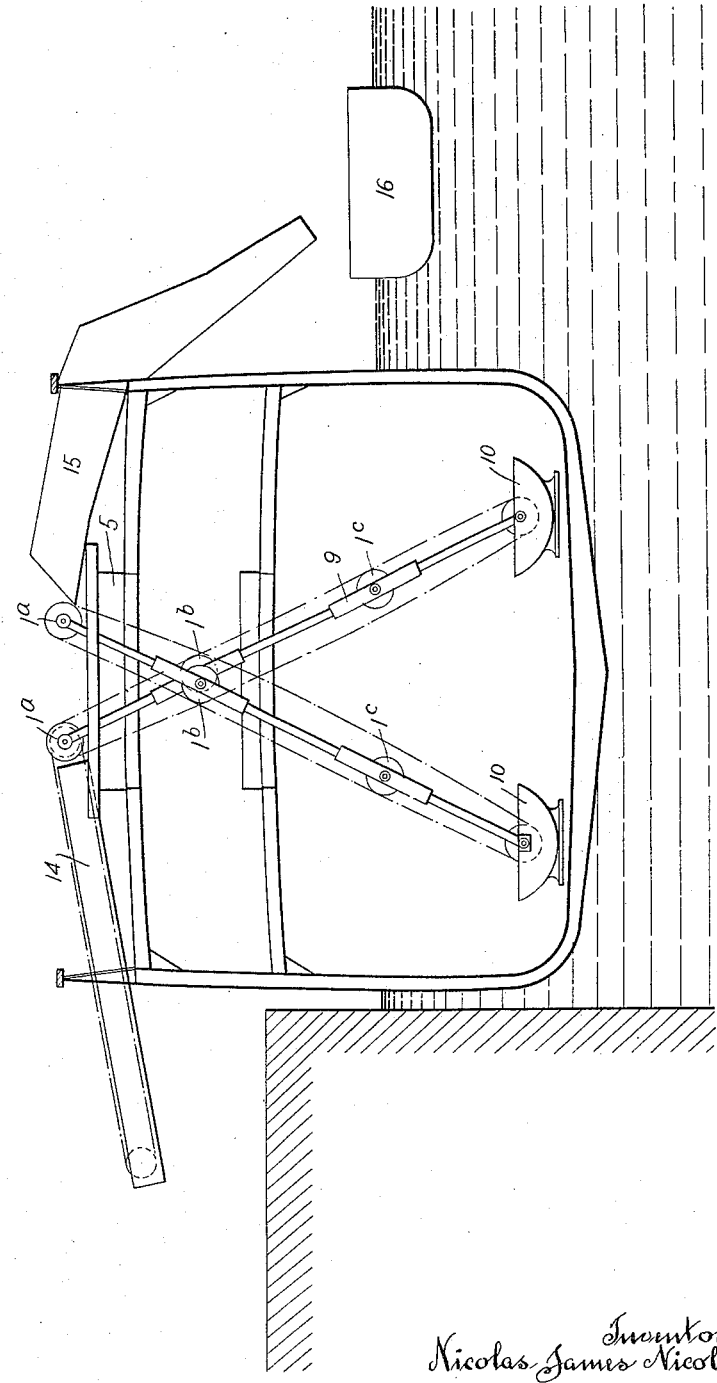
Figure 2:
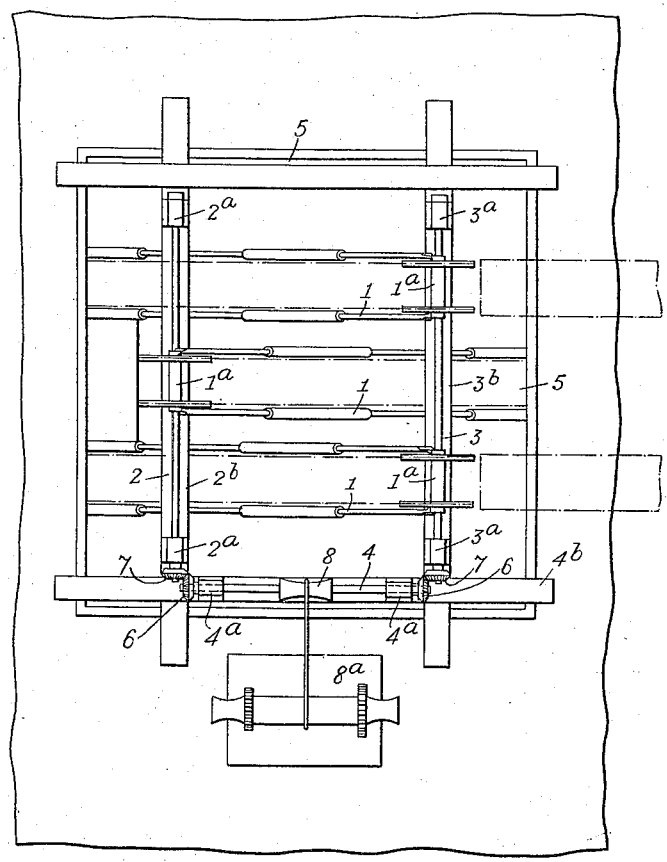
Figure 3:
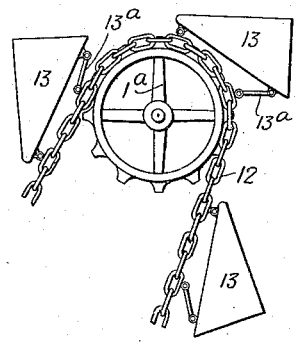
Figure 5:
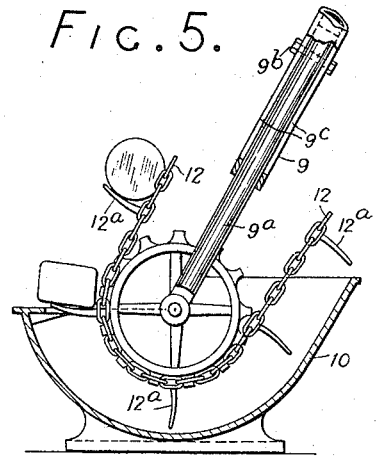
Figure 4:
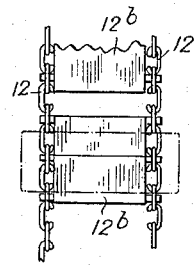
Figure 6:
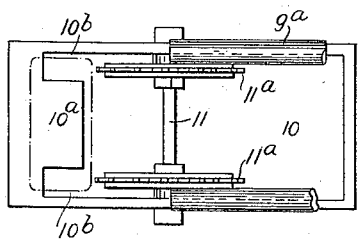
Figure 7:
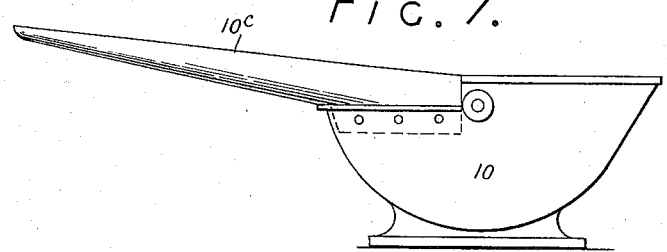

Figure 1 illustrates in transverse section, the hold of a ship furnished with the improved means for discharging the cargo, and Fig. 2 is a plan view of the hatchway and shows the disposition of the elevators. Fig. 3 shows buckets and means of mounting them on the conveyer. Fig. 4 shows supporting members as applied to the conveyer chains for supporting material in transit. Fig. 5 is a vertical section of the boot and adjacent parts. Fig. 6 is a plan of the same, and Fig. 7 shows an auxiliary chute to be used in connection with the boot.

In carrying out my invention I employ a plurality of elevators 1 the heads of which are mounted upon shafts 2, 3, arranged approximately parallel to each other and driven simultaneously by means of a transverse shaft 4. In the construction illustrated the shafts 2, 3, are supported in bearings $2^a$, $3^a$, mounted upon beams $2^b$, $3^b$, which are placed upon the coamings 5 of the hatchway, while the shaft 4 is supported in bearings $4^a$ mounted upon a beam $4^b$ placed transversely of the beams $2^b$, $3^b$.

The shaft 4 is furnished at each end with a bevel wheel 6, and these bevel wheels mesh respectively with bevel wheels 7, 7 mounted upon the shafts 2 and 3. Midway of the shaft 4 is a drum or pulley 8 which is driven from the winch $8^a$ or by an engine. The shaft 4 is preferably of such a length as to be suitable for hatches of any width and the bevel wheels 6 as also the pulley 8 are slidably mounted thereon so that they may be adjusted to any desired position.

In the arrangement illustrated the shaft 2 is provided with one elevator and the shaft 3 with two elevators but each shaft may be provided with two or more elevators if desired, according to the length of the hatchway and the power of the winch or engine employed to drive the elevators. Each shaft passes through the upper pair of sprocket wheels $1^a$ of the elevator or elevators, and the latter may be slid along the shaft to the desired position. To enable this to be accomplished the shafts 2 and 3 may be each formed with a groove for the passage of a key provided in the sprocket wheels $1^a$ at the upper ends of the elevators. In a similar manner the bevel wheels 6 and the pulley 8 are adjustable along the shaft 4.

The elevators comprise telescopic sides which, in the example illustrated consists of a series of metal tubes 9 within which slide rods or tubes $9^a$. At the lower end of the elevator is a "boot" 10 of the form shown in Figs. 5, 6 and 7, and transversely of this "boot" is mounted a shaft 11 to which the lower ends of the telescopic portions $9^a$ of the elevator are attached. Upon the shaft is also mounted a pair of sprocket wheels $11^a$ around which the elevator chains 12 pass.

On the top of the "boot" 10 and on that side where the chains 12 pass upward is provided a platform or support $10^a$ formed with recesses $10^b$, $10^b$; the platform $10^a$ serving to support each package in position to be lifted by one pair of a series of arms $12^a$ or like carriers adjustably mounted upon the elevator chains 12 at suitable distances apart. In addition to the arms $12^a$ the chains 12 may be provided with battens or pieces of wood $12^b$ (Fig. 4) which extend from the one chain to the other and which serve to form an apron to support the packages.

Instead of battens for supporting the packages any other suitable form of apron may be employed. The arms 12ª are provided for use when the cargo comprises bales, barrels, packages or the like, but when the cargo to be discharged consists of grain, coal, or other like bulk cargo, the elevator is provided with buckets 13 which are mounted upon the elevator chains preferably in the manner shown in Fig. 3.

Each bucket 13 is pivotally mounted at its rear end upon the elevator chains 12 while its forward end is connected by means of a pivoted link 13ª to the said chains, this pivoted link serving to permit of the bucket passing over the upper sprocket wheels 1ª of the elevator. Furthermore when bulk cargo is to be discharged the boot 10 is provided with a chute 10ᶜ (as shown in Fig. 7) into which the coal, grain, or the like is fed and conveyed to the buckets. The cargo, whether bulk or otherwise, may, however, be fed to the elevator by means of a conveyer, or by other means, as is well known.

The elevator chains 12 may be built of links of any suitable construction, and in the construction illustrated the links are, by way of example, C-shaped so that they may be readily connected together. To support the chains intermediate of the ends of the elevator the latter may be provided with additional sprocket wheels 1ᵇ, 1ᶜ, Fig. 1. These additional wheels can be mounted between oppositely disposed outer tubes 9 of the telescopic sides of the elevators.

In the unloading of a ship with my improved apparatus the elevators 1 are suspended from the shafts 2 and 3, (Fig. 2) which are supported upon the hatch coamings in the manner hereinbefore described, and the telescopic sides 9 of the elevators are extended so that the boot of each elevator may be placed in the desired position. To fasten together the several lengths forming the telescopic sides of the elevator, each rod or tube 9ª may be furnished with one or more bolts 9ᵇ the ends of which (Fig. 5) pass through slots 9ᶜ formed in the tubes 9. The shafts 2 and 3 are now driven simultaneously from the shaft 4 to operate the several elevators collectively and the cargo to be discharged is fed to the "boot" of each elevator, whence it is lifted by the elevator buckets or carriers and is thence discharged into a conveyer 14, Fig. 1, communicating with the quay or into a chute 15 communicating with a barge 16. It will thus be seen that by the employment of two or more elevators worked simultaneously in one hold, that portion of the cargo required for transit by land may be discharged directly on the quay, while that portion of the cargo required for transit by water may be discharged into the barge. As the unloading of the vessel proceeds and the level of the cargo becomes lower in the hold the elevators are readily extended by drawing out the telescopic sides and the chains of the elevators lengthened by the addition of links and buckets or carriers. In loading a ship the elevators instead of extending into the hold extend over the sides of the ship, and as the packages are raised by the elevators from the quay they are delivered upon the heads of additional elevators of a similar kind which extend into the hold and which lower the packages. In the case of bulk cargo the coal, grain or the like is discharged directly into the hold from the heads of the lifting elevators, or into chutes.

What I claim as my invention and desire to secure by Letters Patent, is:—

1. In a conveyer system, the combination of a supporting frame comprising a pair of longitudinal sills, and a pair of transverse sills mounted on said longitudinal sills, a shaft journaled on each of said longitudinal sills, a drive shaft journaled on one of said transverse sills, gear connections between said transverse and longitudinal shafts, means for actuating said transverse shaft, conveyer heads mounted in alternate relation on said longitudinal shafts, boots arranged beneath said longitudinal shafts in spaced series, and conveyers extending between the heads on said shafts and the respective oppositely-arranged boots, substantially as described.

2. The combination with a ship provided with a hatchway, of means for unloading said ship comprising a horizontally-extending conveyer mounted over the side of the ship and arranged with its receiving end over said hatchway, a plurality of chutes supported on the opposite side of said ship, a frame supported over said hatchway, a pair of longitudinal shafts journaled in said frame, a transverse shaft journaled in said frame, gear connections between said longitudinal and transverse shafts for driving the former in opposite directions, a source of power for actuating said transverse shaft, conveyer heads mounted on said longitudinal shafts in alternate relation and respectively in position to discharge into said conveyer and chutes, boots arranged in spaced-apart series in the hold of said ship, and conveyers extending between said heads and boots, substantially as described.

In witness whereof I have hereunto set my hand in the presence of two witnesses.

NICOLAS JAMES NICOLAIDES.

Witnesses:
T. COKKINOS,
A. ESONOMON.